Figure 1:
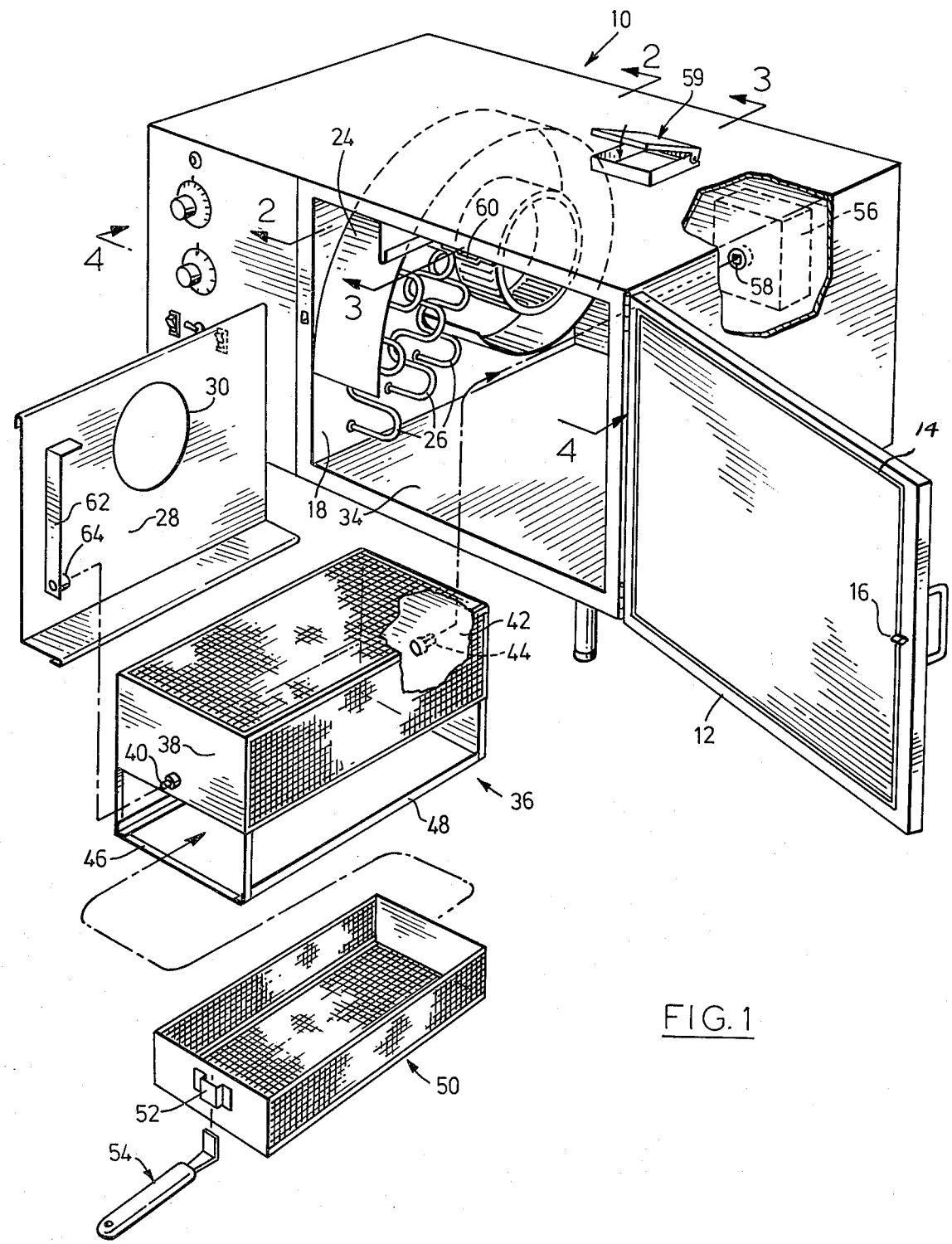

United States Patent [19]
Langhammer

[11] 4,295,419
[45] Oct. 20, 1981

[54] CONFINED AIR FOOD HEATING APPARATUS

[75] Inventor: Jerome Langhammer, Rexdale, Canada

[73] Assignee: Larry Poulson, Mission, Canada

[21] Appl. No.: 148,966

[22] Filed: May 12, 1980

[51] Int. Cl.³ .............................................. A47J 43/18
[52] U.S. Cl. ................................... 99/427; 99/443 R; 99/447; 99/450; 219/389; 219/400
[58] Field of Search ............ 99/447, 427, 450, 443 R, 99/426; 219/389, 400; 126/261, 274, 21 A; 34/133

[56] References Cited
U.S. PATENT DOCUMENTS

| 1,993,607 | 3/1935 | Kalgren | 99/427 X |
| 2,004,775 | 6/1935 | Wright | 99/427 X |
| 3,870,193 | 3/1975 | Schneider | 99/427 X |
| 4,068,572 | 1/1978 | Vogt | 99/447 |
| 4,155,294 | 5/1979 | Langhammer | 99/427 |
| 4,203,358 | 5/1980 | Vogt | 99/447 X |

Primary Examiner—Billy J. Wilhite

[57] ABSTRACT

A housing for heating and rotating foodstuffs has a rotary foodstuff container through which heated air may pass during the heating of the foodstuffs. A door is provided so that the container may be removed axially from the housing. Suspension means for the container are also removable through the door opening. The door is designed to relatively seal the housing when closed.

6 Claims, 4 Drawing Figures

CONFINED AIR FOOD HEATING APPARATUS

This invention relates to a device for cooking foodstuffs, by tumbling of such foodstuffs in heated air. The invention is particularly suitable for but is not limited to cooking potato chips.

Prior designs for such equipment include Canadian Pat. No. 887,585 to Vogt. Vogt shows a housing with a rotary foodstuff tumbler in a bell with an impeller over the bell to circulate heated gases through the foodstuffs. Such design has had unsatisfactory mechanical performance and has been difficult to clean.

Many of the problems with Vogt were solved by the design shown in Canadian Pat. No. 1,045,926 to Winkler et al which disclosed a housing having a rotary foodstuff tumbler and a laterally displaced air heating and circulating device. The latter arrangement solved the mechanical and the cleaning problems of Vogt device. However, the design of Winkler involved a rotating partial cover for the access opening in the housing and a support for the foodstuffs container which allowed the air to freely move into and out of the housing about the partial cover. The result was that when the Winkler device was used many times a day, in a small area, the cooking odours were sometimes unduly strong.

Accordingly, this invention provides a housing wherein a rotatable foodstuffs tumbler is laterally disposed from an air heating and circulating unit. However, the design for support of the tumbler allows the tumbler and its support to be completely within the housing which is thus provided with a door to substantially close the opening. Such substantial closure is by no means air tight but will greatly reduce the odours emitted relative to the Winkler device.

Although the inventive housing is designed to be more nearly air tight than prior devices it is necessary with such housing and with the inventive design (under the regulations of some jurisdictions) to provide a vent operable on the buildup of a predetermined amount of pressure inside the housing. This vent however may be releasably biased closed, to open on such excess pressure. However the presence of such vent does not detract from the advantages of the invention in providing a substantially closed housing under normal conditions.

In accord with a preferred embodiment of the invention, there is provided a food tumbling frame with means for inserting and removing the foodstuffs. A support is provided on the rearward wall of the housing for rotatably supporting the rearward end of said frame. The frame is so supported in alignment with the door and the door opening in the housing. A detachable support is provided for rotatable supporting the forward end of the frame. This support and frame are arranged to be located inside the housing when the door is closed. The detachable support is so arranged relative to the frame, that the foodstuffs may be withdrawn from or added to the frame with the frame and outer support in place. On the other hand, the outer support and the frame are designed and arranged so that they may be withdrawn from the housing for cleaning. Means are provided, preferably combined with the rear frame support for rotating the frame in situ. In the housing, and laterally disposed from the locus of the rotating frame, are provided means for heating and circulating in the housing, the air which heats the foodstuffs.

Figure 2:
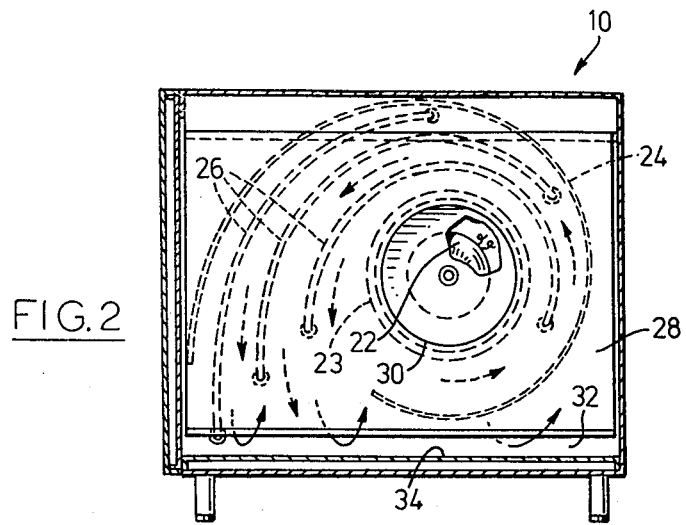
Figure 3:
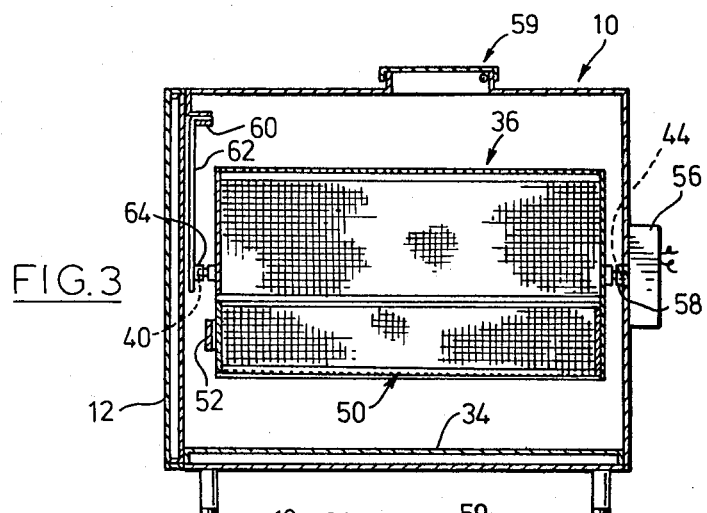
Figure 4:
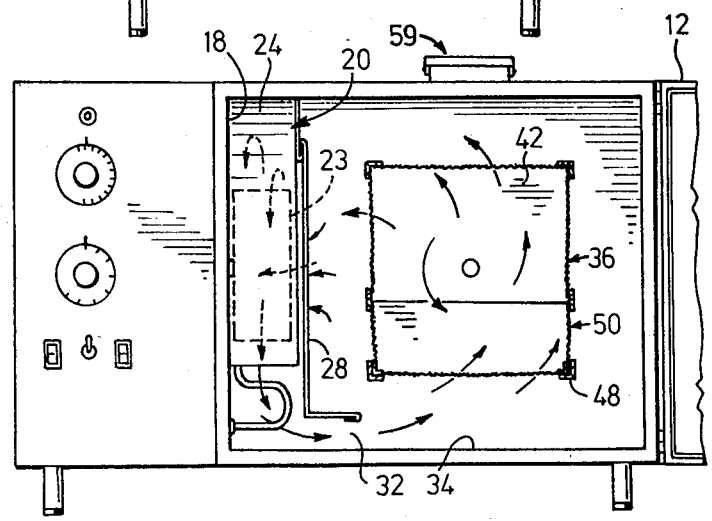

In drawings which illustrate preferred embodiments of the invention:

FIG. 1 is an exploded perspective view of a device in accord with the invention, FIG. 2 is a partial view and cross-section along the lines 2—2 of FIG. 1 showing the heating and air circulating means, FIG. 3 is a partial view and cross-section along the lines 3—3 of FIG. 1 showing the frame, and supports in side view, FIG. 4 is a partial front view of the housing with the door removed.

In the drawings, a rectangular housing 10 is shown having a forwardly opening door 12 on the right side of its forward wall. The forwardly opening door is bordered with any suitable sealing material 14 such as silicone based gasket type material about the door. The closure means 16 for the door, shown only schematically herein, is designed so that such gasketing 14 effectively seals the periphery of the door when the door is closed. A wall 18 partially defines an area 20 in the housing inset behind the front wall of the housing and laterally disposed from the area of the housing aligned with the door. In this area the air heating and circulating means are located comprising a centrifugal fan schematically shown at 22, an outwardly spiraling wall 24 thereabout defining an air path and heating elements 26 in the path. A wall 28 separating the heating area from that foodstuff cooking area in the housing aligned with the door, provides an inlet 30 to the centre of the fan and is spaced from the bottom wall of the housing at 32 to allow the travel of air heated and driven by the fan 22 to enter the foodstuff cooking chamber along the bottom wall 34 of the housing.

On the side of the housing 10 remote from the foodstuff heating chamber are schematically indicated the controls for the heating, fan and motor.

Dealing now with the foodstuff cooking frame and the mounting and drive therefor, it is desired to describe the foodstuff cooking frame first.

The frame 36 is preferably rectilinear being square in its forward to rearward cross section. Forward wall 38 mounts a stub shaft 40 projecting forwardly, while rearward wall 42 mounts a stub shaft 44 keyed (here square) for cooperation with a driving means. The top wall of the frame and the side wall down to just below the level of the stub shafts 40 and 44 are provided with an apertured or mesh construction designed to retain the foodstuffs while allowing air circulation therethrough. The bottom frame members 46 and 48 are designed to slidably mount a drawer 50 which slides into the frame through the front thereof where the forward wall is cut off just below stub shaft 40 to provide, with the forward members of the frame, the drawer opening. The drawer is formed with side and bottom walls with apertures or mesh of similar construction to that of the frame, for the same purpose and the drawer 50 is designed so that, when in place, it forms, with the frame 36, a container in which the foodstuffs may be retained while tumbled by rotation of the frame.

For convenience in withdrawing the drawer, a small loop 52 is fastened on its front wall, to which may be attached the tool 54 when the drawer is to be inserted or withdrawn from the frame with the latter in situ.

It will be noted that any shape of frame 36 and drawer 50, with design for air circulation therethrough, may be used, it only being necessary that the drawer, be on one side only of the pivot point (and open towards the rotary axis).

It is also within the scope of the broader, although not the preferred, aspects of the invention to construct a frame without a drawer but with another opening for food withdrawal and insertion, since means will be described to allow removal of the entire frame. However the drawer and frame construction shown is preferred for convenience.

The frame 36, as shown, cooperates with rotating and mounting means in the housing as now described. The rear wall of the housing mounts rotary means 56 which in use provides a rotating socket 58 to receive and key to the stub shaft 44. At the forward side of the housing a loop 60 on the top and at the centre of the housing opening mounts a hanger 62 which when installed hangs into the opening to mount a socket forming means 64 to receive and rotatably mount the forward stub shaft 40 and thereby the forward end of frame 36. The hanger 62, in place thus mounts the forward end of the frame, its rearward portion supported and driven by the drive means socket 58.

The hanger 62 stops clear of the drawer 50 (FIG. 3) so that the drawer may be removed and inserted clear of the hanger, when the drawer is at the bottom of the frame.

Frame 36 and hanger 62 are designed so that in use, and as shown in FIG. 3, they are inside the closed door 12 (FIG. 3).

Other forward mounting means than the hanger may be used, but it must allow removal of the frame from the housing for cleaning and when used with a frame having a drawer, must allow removal of the drawer without interference. (It must also, of course allow rotation of the frame during the cooking operation).

Other rotary drive couplings may, of course, be used.

In use, the frame is mounted on its rear mounting means and hanger with the drawer locus at the bottom, foodstuffs, say potato chips for cooking are located in the drawer 50 which is slid into the frame. The door 12 is closed, substantially closing off the inner part of the housing. The spring loaded vent 59 on the top of the casing will open if an excess of pressure develops inside the housing).

With the foodstuffs, drawer and frame in place, the drive is caused to rotate the frame and tumble the foodstuffs and the fan and heater are turned on to cook to food. When the food is cooked, the heater and fan are stopped and door is opened, the frame 36 will be manually or automatically stopped with the drawer 50 at the bottom. The drawer may then be withdrawn to remove the foodstuffs. A new batch of foodstuffs may be placed in the drawer to respect the operation.

When it is desired to clean the equipment, the door 12 is opened, and hanger 62 and the frame 36 removed from the housing, rendering cleaning simple.

I claim:

1. Means for cooking foodstuffs comprising:
   a walled housing defining forward and rearward walls, and an opening in said forward wall;
   means on said rearward wall for rotatably and removably mounting the rearward end of a food container;
   means projecting into said opening adjacent the forward side of said housing for rotatably supporting the forward end of such container;
   a container for foodstuffs designed to be removably rotatably mounted on said inward and outward mounting means;
   means for rotating said container when so mounted;
   said means for mounting the forward end of said container being designed: to be removable to allow said container from said housing through said opening and to expose at least a portion of said container below said forward mounting means;
   said container when so mounted, and said forward and rearward mounting means being within said housing a door designed to substantially close said opening when said container is so mounted,
   said container being provided with side openings to allow passage of air through foodstuffs therein,
   said container being provided with means allowing removal of foodstuffs therefrom and the supply of foodstuffs thereto;
   means for heating and circulating air in said housing.

2. Means for cooking foodstuffs comprising:
   a frame for foodstuffs having a forward and a rearward end,
   rotary mounting means on each of said forward and rearward ends,
   a drawer slidably removable from said frame in said forward direction;
   said drawer and said frame forming a container for foodstuffs;
   means for allowing the passage of air through said container;
   a housing including forward and rearward walls and having an opening for removal and insertion of said container in said forward wall;
   a door for substantially closing said opening,
   means adjacent the rear wall designed to rotatably mounts said frame rearward rotary mounting means, aligned with said opening,
   means for detachable mounting on said housing adjacent the forward wall of said housing, designed to rotatably mount said frame forward rotary mounting means.

3. Means as claimed in claim 2, wherein:
   said detachable mounting means and said drawer are designed and arranged so that, in a predetermined orientation of said frame, said drawer may be withdrawn from and inserted in said frame.

4. Means for cooking foodstuffs comprising:
   a housing wherein a rotatable foodstuffs tumbler frame is laterally disposed from an air heating and circulating unit,
   said tumbler frame being adapted to retain foodstuffs placed therein while allowing circulation of air therethrough,
   means for supporting said tumbler frame in said housing, and means for rotating said tumbler when so supported,
   an opening in said housing and a door therefor in said housing designed to allow removal of said tumbler frame when said door is open and to substantially close said opening when closed,
   the design of said tumbler frame and support allowing removal of said tumbler frame through said opening when said door is open,
   wherein said support means comprises a rear support to connect to and rotate said tumbler frame and a forward support projecting into said opening.

5. Means as claimed in claim 4 wherein said forward support and said tumbler frame are removable through said opening when said door is opened.

6. Means as claimed in claim 4 wherein said forward support is designed to leave the lower portion of said tumbler frame exposed in the direction of said opening, and wherein said tumbler frame is provided with a drawer which in a predetermined orientation of said tumbler frame be designed to be located in said lower portion, whereby said drawer may be withdrawn and inserted to withdraw and insert foodstuffs in said tumbler frame when said tumbler frame is supported by said support.

* * * * *